(12) United States Patent  
Breuer

(10) Patent No.: US 8,396,642 B2
(45) Date of Patent: Mar. 12, 2013

(54) ADAPTIVE CRUISE CONTROL SYSTEM

(75) Inventor: Karsten Breuer, Lauenau (DE)

(73) Assignee: WABCO GmbH, Hannover (DE)

( * ) Notice: Subject to any disclaimer, the term of this patent is extended or adjusted under 35 U.S.C. 154(b) by 372 days.

(21) Appl. No.: 12/736,168

(22) PCT Filed: Dec. 19, 2008

(86) PCT No.: PCT/EP2008/010889
§ 371 (c)(1),
(2), (4) Date: Oct. 20, 2010

(87) PCT Pub. No.: WO2009/115110
PCT Pub. Date: Sep. 24, 2009

(65) Prior Publication Data
US 2011/0040467 A1 Feb. 17, 2011

(30) Foreign Application Priority Data

Mar. 18, 2008 (DE) .................. 10 2008 014 771

(51) Int. Cl.
*B60T 8/172* (2006.01)
*B60W 30/16* (2012.01)
*G08G 1/16* (2006.01)
(52) U.S. Cl. ............................ 701/96; 340/436; 701/301
(58) Field of Classification Search ...................... 701/96
See application file for complete search history.

(56) References Cited

U.S. PATENT DOCUMENTS

| 6,243,640 | B1 * | 6/2001 | Beever ............................... 701/70 |
| 6,273,204 | B1 | 8/2001 | Winner et al. |
| 6,285,944 | B1 * | 9/2001 | Tange et al. ..................... 701/96 |
| 6,339,740 | B1 * | 1/2002 | Seto et al. ........................ 701/96 |
| 6,362,729 | B1 * | 3/2002 | Hellmann et al. ............ 340/436 |
| 8,292,784 | B2 * | 10/2012 | Umakoshi et al. ............... 477/73 |
| 2002/0101337 | A1 * | 8/2002 | Igaki et al. ..................... 340/436 |
| 2003/0109979 | A1 * | 6/2003 | Schuster et al. ................ 701/70 |
| 2004/0078133 | A1 | 4/2004 | Miller et al. |
| 2005/0168328 | A1 * | 8/2005 | Kitterer et al. ................ 340/435 |
| 2005/0275285 | A1 * | 12/2005 | Higuchi ......................... 303/146 |
| 2006/0152350 | A1 * | 7/2006 | Swoboda et al. .............. 340/435 |
| 2006/0195231 | A1 * | 8/2006 | Diebold et al. ..................... 701/1 |
| 2007/0078584 | A1 * | 4/2007 | Nakamura et al. .............. 701/93 |
| 2007/0142996 | A1 | 6/2007 | Lee |
| 2007/0192009 | A1 * | 8/2007 | Braeuchle et al. .............. 701/70 |
| 2007/0282513 | A1 * | 12/2007 | Michi et al. ..................... 701/96 |
| 2009/0150038 | A1 * | 6/2009 | Woods ............................. 701/93 |

FOREIGN PATENT DOCUMENTS

| DE | 196 40 694 A1 | 4/1998 |
| DE | 198 57 992 A1 | 6/2000 |
| DE | 102 31 687 A1 | 1/2004 |
| DE | 103 38 565 A1 | 3/2005 |
| DE | 10 2005 045 488 A1 | 4/2006 |
| EP | 1 705 624 A1 | 9/2006 |
| EP | 1 867 516 A2 | 12/2007 |

* cited by examiner

*Primary Examiner* — Shelley Chen
(74) *Attorney, Agent, or Firm* — Kramer Levin Naftalis & Frankel LLP

(57) ABSTRACT

An adaptive cruise control system for a motor vehicle includes a service brake comprising an electronic controller programmed/configured to detect driving data of the vehicle and distance data to a preceding vehicle, to calculate a movement prediction based on the driving and distance data, to influence the movement of the vehicle by influencing driving and braking, and to output a warning signal to the vehicle driver if the prediction indicates that, assuming a predetermined limiting braking retardation, a probability of an impact with another vehicle, with the adaptive cruise control system being activated, exceeds a predetermined impact probability threshold value without any intervention on the part of the driver. The controller is configured to detect braking parameters, based on which a maximum braking retardation that can be achieved with the service brakes can be calculated, and to reduce the limiting retardation, if the maximum retardation is below a predetermined value.

12 Claims, 1 Drawing Sheet

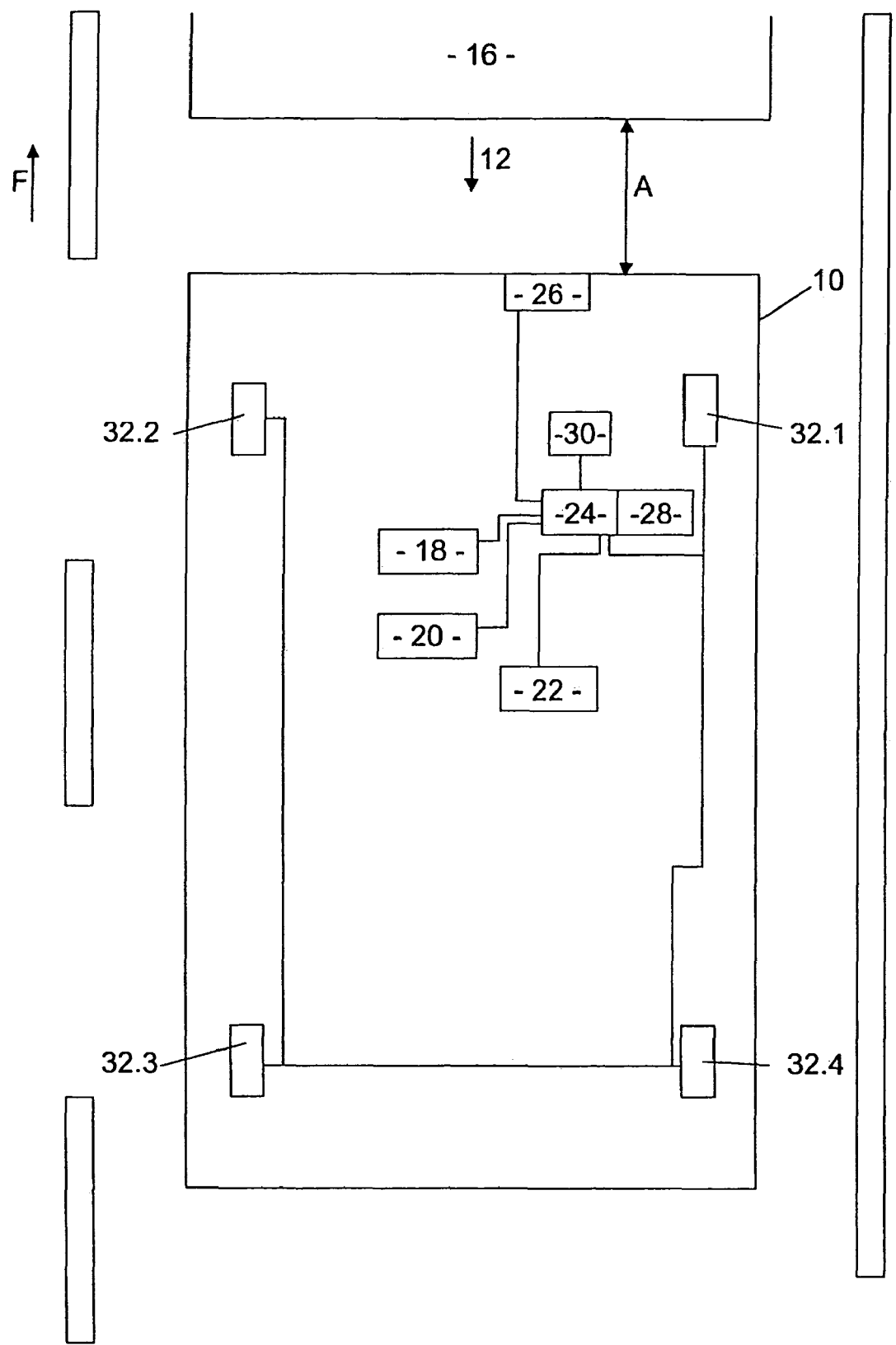

ADAPTIVE CRUISE CONTROL SYSTEM

FIELD OF THE INVENTION

The present invention generally relates to embodiments of a headway regulated cruise control system for a motor vehicle having a service brake, which comprises an electronic controller configured to detect operating data of the motor vehicle, produce a motion prediction from the operating data, influence a state of motion of the motor vehicle on the basis of the motion prediction, and output a warning signal to a driver of the motor vehicle if the motion prediction shows that, assuming a predetermined limiting retardation, a probability of a collision with another motor vehicle exceeds a predetermined threshold value.

BACKGROUND OF THE INVENTION

A headway regulated cruise control system of the general type under consideration is also known as ACC (adaptive cruise control, adaptive speed control). A headway regulated cruise control system influences the state of motion of the motor vehicle, taking into account the distance with respect to a preceding vehicle. Using a multiplicity of sensor data, such as the vehicle's own speed and the speed relative to the preceding vehicle, the headway regulated cruise control system cuts back the power of the engine or actively initiates braking if the distance with respect to the vehicle in front falls below a predetermined threshold value.

Headway regulated cruise control serves to assist the driver and should be distinguished from autonomous emergency braking systems. Such an emergency braking system is an electronic system designed to trigger an autonomous full braking operation independently of the driver. In contrast, a headway regulated cruise control system has a limiting retardation, which must not be exceeded by an action of the system on the motor vehicle. In other words, the headway regulated cruise control system cannot automatically brake the motor vehicle more sharply than is allowed by the limiting retardation.

In order to request the driver to reassume control of the vehicle from the headway regulated cruise control system in good time because the latter would be overloaded by the current traffic situation, the headway regulated cruise control system produces a motion prediction. A motion prediction is a mathematical model that extrapolates from the operating data of the motor vehicle, such as driving data in the form of the speed of the vehicle and its acceleration, and data on the distance with respect to a preceding vehicle, in particular the distance with respect to the preceding vehicle in future. In the case of known headway regulated cruise control systems, a warning is issued to the driver of the motor vehicle if the motion prediction shows that an acceleration greater than the predetermined limiting retardation is necessary to avoid a collision with the vehicle in front.

A disadvantage with known headway regulated cruise control systems is that they can lull the driver into a false sense of security if a warning is not issued even though intervention by the driver is urgently necessary.

SUMMARY OF THE INVENTION

Generally speaking, it is an object of the present invention to provide a headway regulated cruise control system that always gives the vehicle driver a warning signal in good time.

This object is achievable by means of a headway regulated cruise control system in accordance with embodiments of the present invention in which the electronic controller is set up to detect braking parameters by means of which a maximum braking retardation that can be achieved with the service brakes can be calculated and to reduce the limiting retardation if the maximum braking retardation falls below a predetermined threshold value.

The advantage of this is that the warning signal is then output earlier when the service brakes are not capable of achieving the braking retardation according to their specification, to such a small extent that the absence of the warning signal gives the driver a deceptive sense of security. If, for example, the service brakes have run hot due to continuous braking, the warning signal must be output earlier to prevent the driver from mistakenly believing that the headway regulated cruise control system activated by the driver could on its own safely control the distance with respect to the preceding vehicle. However, if the driver receives a warning signal, the driver can reduce the driving speed, for example, on the driver's own initiative and avoid a critical situation.

It is furthermore advantageous that existing headway regulated cruise control systems can easily be upgraded to a headway regulated cruise control system according to embodiments of the invention. For this purpose, all that is required is to modify the program stored in the electronic controller.

Within the context of the present description, the recitation "operating data of the motor vehicle" is understood to mean, in particular, driving data, namely data on speed, acceleration and braking retardation. Operating data can also include engine data, e.g., engine power. In other words, the operating data are those data, the changing of which influences the state of motion of the motor vehicle. The operating data of the motor vehicle can also include a steering angle.

The recitation "distance data" is understood to mean, in particular, a distance with respect to a preceding vehicle, a speed relative to the preceding vehicle or a change in the speed relative to the preceding vehicle.

The recitation "motion prediction" is understood to mean, in particular, the algorithm designed to derive a prediction of the distance with respect to the preceding vehicle in the immediate future, e.g., within the next 10 seconds, from data detected in the motor vehicle. The feature that the collision probability exceeds a predetermined threshold value is to be understood, in particular, to mean that the headway regulated cruise control system will not be able on its own to prevent a collision with the preceding vehicle without an intervention by the driver and hence authorizes outputting of the warning signal. It is not necessary for a probability to be calculated and compared with the predetermined threshold value in the mathematical sense. On the contrary, it is sufficient that it should be possible to issue a verdict on the basis of the motion prediction as to whether there is a danger of a collision with the preceding vehicle or not.

The recitation "operating parameter" is understood to mean, in particular, the parameter that permits a conclusion to be drawn as to the maximum achievable braking retardation. It is possible here that the braking parameter should assume continuous or discontinuous values. For example, the braking parameter can be a temperature of the service brake and hence represent a continuous variable. However, it is also possible that the braking parameter will merely code the binary state representing whether a predetermined temperature of the service brakes has been exceeded. It is furthermore possible for a number of braking parameters to be detected and for the maximum braking retardation to be read off from a characteristic map stored in a digital memory. Also, the recitation "braking parameter" is understood to mean a maximum torque that can be applied to a wheel, which can be detected by a closed-loop anti-slip controller.

The recitation "maximum braking retardation" is understood to mean, in particular, a value representing a braking retardation that can be achieved reliably by the service brakes. This need not be the maximum value that can be achieved by the service brakes. It can also be the value that can be achieved by the service brakes without damaging the service brakes, for example.

In a preferred embodiment, the electronic controller is set up to reduce the limiting retardation if the maximum braking retardation falls below the limiting retardation. In other words, this is the case if the inherent assumption of the headway regulated cruise control system is that a predetermined limiting retardation should be achieved but this is not possible owing to boundary conditions. If the limiting retardation were not reduced in this case, a warning signal might only be output when it was no longer possible for the driver to prevent an accident solely by braking.

It is particularly preferred that the electronic controller should be set up to reduce the limiting retardation to a product of the maximum braking retardation with a safety factor. This ensures that the warning signal is always output at an early stage if the maximum braking retardation falls below the retardation threshold value.

If, for example, a value of 2.5 m/s$^2$ is specified as the limiting retardation and braking parameters are detected, from which a maximum braking retardation of 4 m/s$^2$ is determined, this being below, in terms of magnitude, the retardation threshold value of 4.5 m/s$^2$ specified by way of example, the new limiting retardation is set to the product of the example safety factor of 0.5 and the maximum braking retardation, in the present example therefore to 0.5*4 m/s$^2$=2 m/s$^2$. The driver is then warned as soon as the motion prediction shows that, assuming the limiting retardation of 2 m/s$^2$, there is a risk of a collision, rather than when there is a risk of a collision, assuming a limiting retardation of 3.5 m/s$^2$.

In a preferred embodiment, the braking parameter is a temperature of one of the service brakes or a function of the temperatures of all the service brakes. It is not necessary that the temperature of the service brakes should be the only braking parameter. Hot service brakes can easily be destroyed if they are overloaded. In order to give the driver the opportunity to avert damage to the service brakes by reducing speed, the warning signal is output at an early stage. In particular, the new limiting retardation is chosen so that it is less than the braking retardation that could lead to damage to the service brakes.

It is possible to construct the headway regulated cruise control system in a particularly simple manner if the electronic controller is set up to extract the braking parameter from an EBC5 message, which is sent by the brake system via a data bus of the vehicle, the message being defined in SAE Standard J1939-71.

To enable a warning signal to be output at an early stage in the case of slippery roads, provision is made, according to a preferred embodiment, for the electronic controller to be set up to detect whether an anti-lock system of the motor vehicle has been active for the purpose of controlling the service brake within a predetermined time interval, e.g., 10 seconds, to detect the braking retardation achieved by the anti-lock system and to determine the maximum braking retardation from the braking retardation achieved. It is possible, for example, to calculate the maximum, the minimum or an average from the braking retardation achieved, which is a function of time. The value obtained in this way can be multiplied, if appropriate, with a safety factor in order to obtain the new limiting retardation.

It is particularly preferred that the controller be set up to detect whether the anti-lock system is currently controlling the service brake, to detect the maximum instantaneously achievable braking retardation of the anti-lock system, and to determine the limiting retardation from the instantaneously achieved braking retardation. This ensures that a warning signal is always output in good time when there are rapid changes in the grip of the roadway.

It is possible to construct the headway regulated cruise control system in a particularly simple manner if the electronic controller is set up to extract an "ABS control active" signal from the EBC1 message, which is sent by the anti-lock system via a vehicle bus, the message being defined in SAE Standard J1939-71, and to determine the braking parameter using braking retardations determined from rotational wheel speeds or linear wheel or vehicle speeds. If this is the case, the acceleration is determined from the linear speed or rotational speed values. This can be accomplished by numerical determination of the first or second derivative of the tachometer data with respect to time, for example.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWING

An illustrative embodiment of the invention will be explained in greater detail below with reference to the attached drawing, in which FIG. 1 is a schematic view of a headway regulated cruise control system according to an embodiment of the invention for a motor vehicle.

DETAILED DESCRIPTION OF THE PREFERRED EMBODIMENTS

FIG. 1 shows a motor vehicle 10, which has a front side 12 and is moving in a direction of travel F on a schematically indicated road. A vehicle 16 in front driving ahead of the motor vehicle 10 can be detected by means of a device for detecting a vehicle in front. For its part, the device for detecting a vehicle in front is set up to detect the vehicle 16 in front, i.e., to deliver information as to whether there is any vehicle in front at all, and, on the other hand, to determine a distance A between the front side 12 of the motor vehicle 10 and a rear side of the vehicle 16 in front.

The motor vehicle 10 comprises a detection device for linear wheel and/or vehicle speeds 18, which forms a driving data detection device that detects driving data in the form of a speed of travel $v_F$ of the motor vehicle 10. The motor vehicle 10 furthermore comprises a yaw rate sensor 20 and optionally a braking retardation sensor 22, which can be part of an airbag system for example. The yaw rate sensor 20 and the optional retardation sensor 22 are likewise driving data sensors and detect driving data in the form of a yaw rate and a retardation or acceleration, respectively.

The driving data sensors 18, 20, 22 are connected by an electronic lead to an electronic controller 24, which is furthermore linked to a distance sensor 26 for determining the distance A. The distance sensor 26 detects measurement data at a time interval of, for example, 50 ms, and uses them to calculate the distance A with respect to the vehicle 16 in front. A relative speed $v_{relativ}$ between the motor vehicle 10 and the vehicle 16 in front is furthermore determined from changes in distance A by adding the vehicle speed $v_F$ vectorially to the relative speed $v_{relativ}$.

From the data supplied by the driving data sensors 18, 20, 22, 26, the electronic controller 24 produces a motion prediction, by means of which distance A and, if appropriate, further values, such as the future relative speed as a function of time t, are extrapolated into the future.

A limiting braking retardation $a_{grenz}$ is stored in a memory 28. The electronic controller 24 continuously determines whether the motor vehicle 10 would run into the vehicle 16 in front if it were braked at the limiting retardation $a_{grenz}$. If this is the case, the electronic controller 24 outputs a warning signal to a driver of the motor vehicle 10 via an output device 30. This warning signal can be optical, haptic and/or acoustic.

The electronic controller is in contact with braking devices in the form of service brakes 32.1, 32.2, 32.3, 32.4. It is not necessary that there should be four service brakes 32; in the case of multi-axle motor vehicles, it is also possible for there to be more service brakes. The service brakes 32 comprise a brake controller and are connected to the electronic controller 24 via a data bus 34. The data bus 34 operates according to SAE Standard J 1939 and communicates continuously with the electronic controller 24, which acquires braking parameters of the service brakes 32 from the data bus 34. These braking parameters are, for example, the temperature T of the service brakes, their readiness for operation and their operating state, e.g., whether an anti-lock system of the service brakes 32 is currently active.

From the braking parameters on the data bus 34, the electronic controller 24 continuously determines a maximum achievable braking retardation $a_{max}$ by, for example, matching the braking parameters received with a characteristic map stored in the memory 28. If it is found, for example, that at least one of the service brakes 32.1 to 32.4 is at an increased temperature, by reason of which the magnitude of the maximum braking retardation $a_{max}$ that the service brakes can apply without damage is less than the braking retardation $a_{grenz}$, the electronic controller 24 writes a new value for the limiting retardation $a_{grenz}$ to the memory 28. This new value for the limiting retardation $a_{grenz}$ is obtained by multiplying the maximum braking retardation $a_{max}$ by a safety factor 5, which can be 0.75 for example.

If, assuming the new limiting retardation $a_{grenz}$, it is now found that the vehicle 10 would run into the vehicle 16 in front, a warning signal is output. The driver can then change lanes, for example, or initiate a braking operation with a retardation that is above the limiting retardation $a_{grenz}$ in terms of magnitude. In addition, the driver can be given an indication that the service brakes 32 are at an increased temperature T in order to give the driver the opportunity to relieve the service brakes 32 by downshifting, for example.

If the electronic controller 24 infers from the EBC1 data bus signal that the anti-lock system of at least some of the service brakes 32 is active, it detects the maximum braking retardation $a_{max}$ by means of the retardation sensor 22. As an alternative, the maximum braking retardation $a_{max}$ is calculated by forming the second derivative of the tachometer data of the detection device for linear wheel and/or vehicle speed 18. As described above, the electronic controller 24 changes the value for the limiting retardation $a_{grenz}$ which is stored in the memory 28.

The method described above is carried out continuously. If, after a predetermined time interval, the braking parameters are such that the magnitude of the maximum braking retardation $a_{max}$ determined is above the limiting retardation $a_{grenz}$ set as standard, the original value for the limiting retardation $a_{grenz}$ of, for example, $a_{grenz}$=2.5 m/s² is set once again in the memory 28.

If the motor vehicle 10 has a closed-loop anti-slip controller, it is also possible for a maximum torque that can be applied to a wheel to be detected as a braking parameter.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A headway regulated cruise control system for a motor vehicle having a braking system including a service brake, the system comprising an electronic controller is suitably programmed to detect driving data of the motor vehicle and distance data with respect to a preceding vehicle, calculate a motion prediction from the driving data and the distance data, influence the state of motion of the motor vehicle by influencing one of driving and braking system devices, output a warning signal to a driver of the motor vehicle when the motion prediction indicates that, with a predetermined limiting retardation, with the headway regulated cruise controller activated and without driver intervention, a probability of collision with the preceding vehicle that exceeds a predetermined collision probability threshold value, detect braking parameters for calculating a maximum braking retardation that can be achieved with the service brakes, and reduce the limiting retardation when the maximum braking retardation is below a predetermined retardation threshold value.

2. The headway regulated cruise control system as claimed in claim 1, wherein the retardation threshold value is the limiting retardation.

3. The headway regulated cruise control system as claimed in claim 1, wherein the electronic controller is suitably programmed to reduce the limiting retardation to a product of the maximum braking retardation with a safety factor.

4. The headway regulated cruise control system as claimed in claim 1, wherein the braking parameter is at least one of a temperature of the service brakes and a maximum torque applicable to a wheel of the vehicle detected by a closed-loop anti-slip controller.

5. The headway regulated cruise control system as claimed in claim 4, wherein the electronic controller is suitably programmed to extract the braking parameters from an EBC5 message transmitted by the braking system via a data bus of the motor vehicle.

6. The headway regulated cruise control system as claimed in claim 1, wherein electronic controller is suitably programmed to:

detect whether an anti-lock system of the motor vehicle has been active for the purpose of controlling the service brake within a predetermined time interval, and when the anti-lock system has been active within the predetermined time interval, detect the braking retardation achieved by the anti-lock system and determine the maximum braking retardation from the braking retardation achieved.

7. The headway regulated cruise controly system as claimed in claim 6, wherein the electronic controller is suitably programmed to:

detect whether the anti-lock system is currently controlling the service brake, when the anti-lock system is controlling the service brake, detect the maximum instantaneously achievable braking retardation by the anti-lock system, and determine the limiting retardation from the instantaneously achieved braking retardation.

8. The headway regulated cruise control system as claimed in claim 7, wherein the electronic controller is suitably programmed to:

extract an "ABS control active" signal from an EBC1 message transmitted by the anti-lock system via a data bus of the motor vehicle, and determine the braking parameter from a retardation determined one of (i) by at least one of linear vehicle and wheel speeds and (ii) from a braking retardation detected directly by a sensor.

9. A motor vehicle having a headway regulated cruise control system as claimed in claim 1.

10. A method for effecting headway regulated cruise control in a motor vehicle, the method comprising the steps of:
 (a) detecting driving data of the motor vehicle and distance data with respect to a preceding vehicle,
 (b) calculating a motion prediction from the driving data and the distance data
 (c) influencing the state of motion of the motor vehicle by influencing at least one of driving and braking devices, and
 (d) outputting a warning signal to a driver of the motor vehicle when the motion prediction indicates that, with a predetermined limiting retardation, a collision probability of a collision with the preceding vehicle exceeds a predetermined collision probability threshold value,
 (e) calculating a maximum achievable braking retardation from braking parameters of the service brakes, and
 (f) reducing the limiting retardation when the maximum braking retardation is below a predetermined retardation threshold value.

11. The method as claimed in claim 10, further comprising the step of continuously repeating steps (a)-(f).

12. A headway regulated cruise controller suitably programmed to effect the method steps according to claim 10.

* * * * *

UNITED STATES PATENT AND TRADEMARK OFFICE
CERTIFICATE OF CORRECTION

PATENT NO. : 8,396,642 B2  Page 1 of 1
APPLICATION NO. : 12/736168
DATED : March 12, 2013
INVENTOR(S) : Karsten Breuer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this
First Day of September, 2015

Michelle K. Lee
*Director of the United States Patent and Trademark Office*